Aug. 10, 1948.　　　O. W. RANDOLPH　　　2,446,952
FRUIT AND VEGETABLE COMMINUTOR AND DRIER
Filed April 11, 1942　　　3 Sheets-Sheet 1
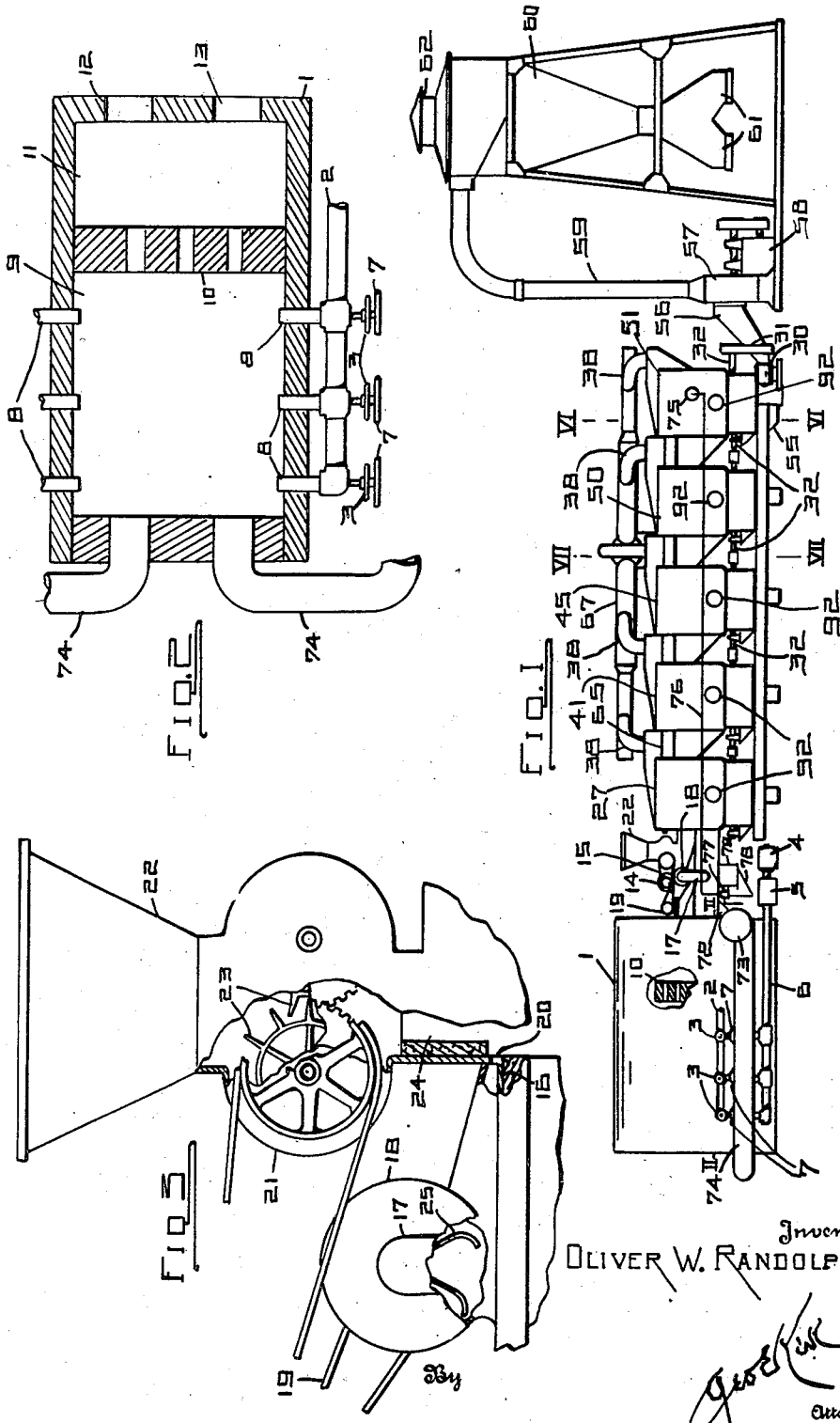
Inventor
OLIVER W. RANDOLPH

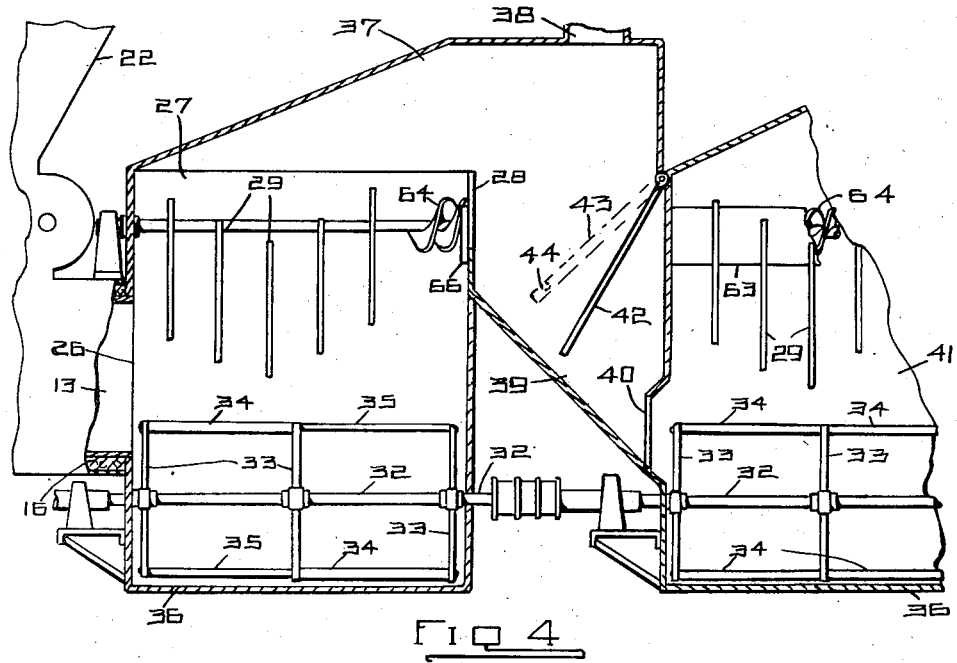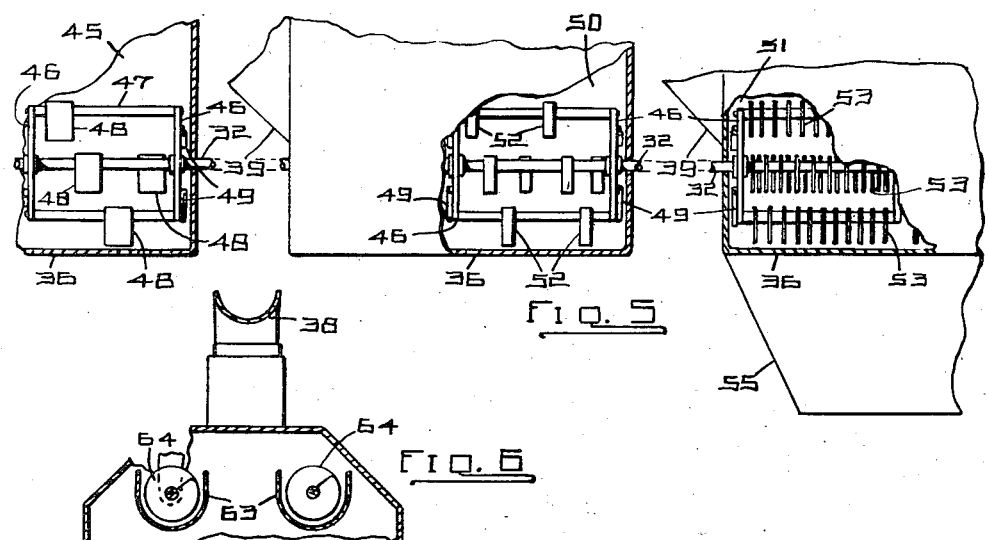

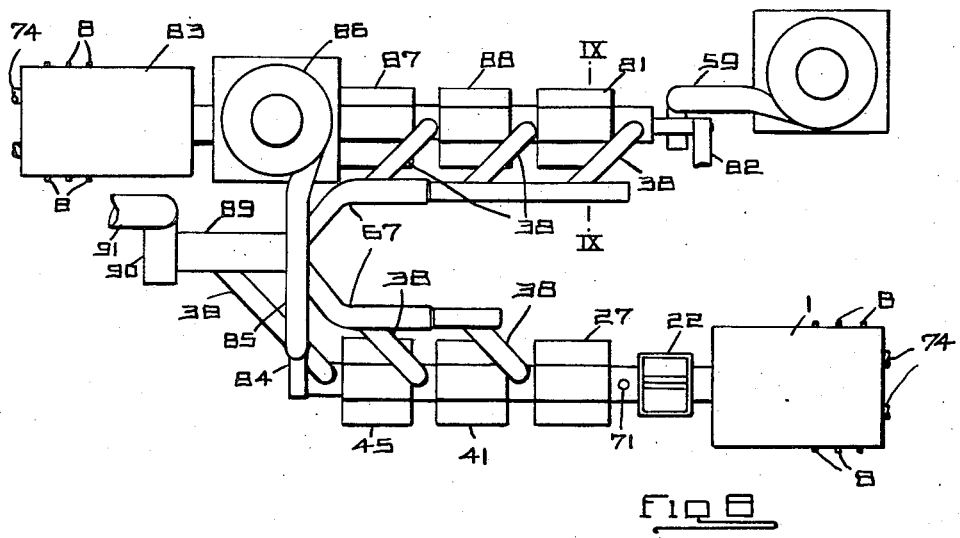
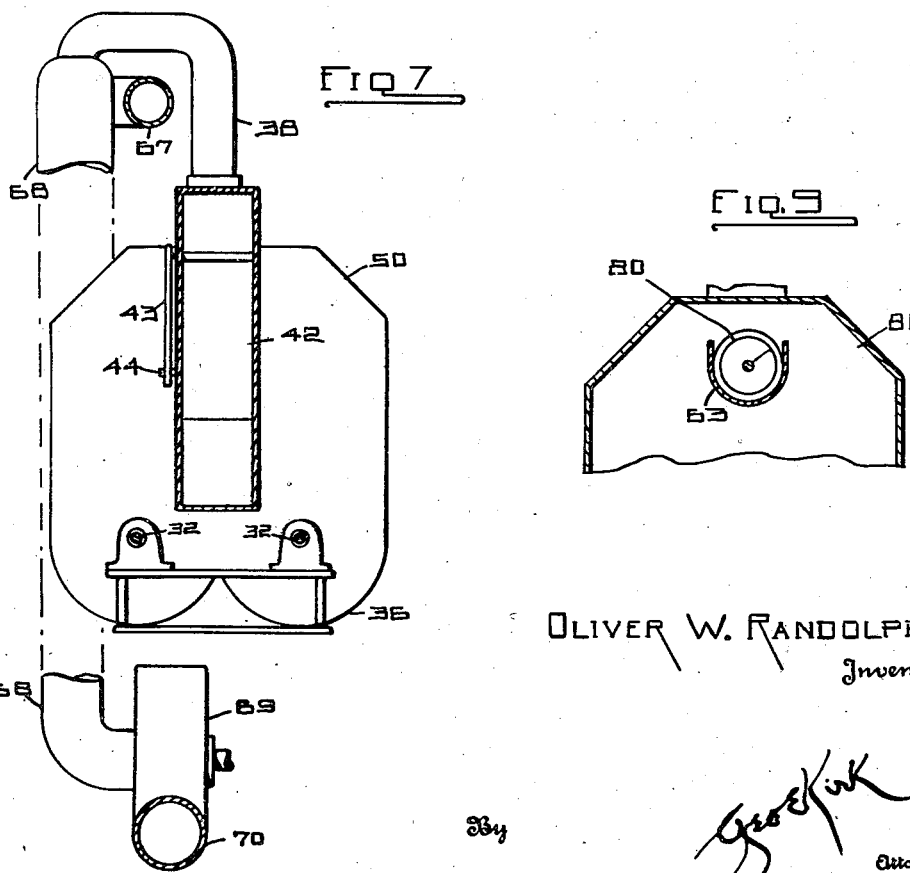

Patented Aug. 10, 1948

2,446,952

UNITED STATES PATENT OFFICE 2,446,952

FRUIT AND VEGETABLE COMMINUTOR AND DRIER

Oliver W. Randolph, Toledo, Ohio

Application April 11, 1942, Serial No. 438,653

3 Claims. (Cl. 241—65)

This invention relates to dehydrating moisture-containing bulk material, more especially feed material for vitamin conservation.

This invention has utility in dehydrating and simultaneously subdividing grass, legumes, and even fleshy root material, for stabilizing condition thereof for storage and use.

Referring to the drawings:

Fig. 1 is a side elevation of an embodiment of the invention in a dehydrator of the subdivider type, hereunder more particularly adapted for handling vegetation;

Fig. 2 is a section on the line II—II, Fig. 1, showing the furnace or heat source hereunder;

Fig. 3 is a fragmentary view on an enlarged scale of the feeder between the heat source or furnace and the pneumatic and mechanical suspension stage structure herein;

Fig. 4 is a fragmentary view in section of the first and second stages of the device of Fig. 1;

Fig. 5 is a fragmentary showing of the third, fourth and fifth stages of the equipment of Fig. 1;

Fig. 6 is a section on the line VI—VI, Fig. 1, final stage;

Fig. 7 is a section on the line VII—VII, Fig. 1, looking to the right and showing the humidity take-off features;

Fig. 8 is a stage set up in sections with intermediate heating provision; and

Fig. 9 is a fragmentary view on the line IX—IX, Fig. 8, showing features of the final stage.

Heat source or furnace 1 (Figs. 1, 2) is herein shown as having fuel supply line 2 with valves 3 independently effective for burner control. Supplementally, motor 4 operating compressor 5 is effective through line 6 and independently adjustable valves 7 for mixing air with the fuel for discharge at the burners 8 in combustion chamber 9 having grill work bridge wall 10 to plenum chamber 11 with outlet ways 12, 13, therefrom as horizontally extending with insulation jacket 16 (Figs. 3, 4) From these ways 12, 13 ducts 17 extend to blowers 18 operated by belt from motor 19, thereby effecting high velocity, horizontally wide and vertically thin, to form a flat blowing draft delivery 20. Motor 14 has speed reduction connection 15 to actuate feeder 21 below hopper 22. This feeder 21 involves opposing projecting teeth or finger elements 23 which, as interfitting, pull fodder or cut up stock from the hopper 22 to deliver even as a thin ribbon into way 24 for pick-up and suspension by the draft slot 20 as built up from the rearwardly deflected blades 25 of the rotary blower 18.

Accordingly, there is pneumatic suspension of the fragments or bulk material from the respective ways 12, 13, discharged through opening means 26 (Fig. 4) into first stage chamber 27. To control the draft in this chamber 27 in transit from the entrance opening means 26 to discharge opening 28 there are suspended baffles 29 therein. In the event any of the fragments or particles be not held in suspension, mechanical beating or suspension retaining means is effected hereunder.

Motor 30 (Fig. 1) through belt 31 drives shaft 32, which is sectional, and in housing or chamber 27 this shaft section 32 has thereon radiating arms 33 carrying flat beater strip 34 and counter-balancing such beater strips to connecting bars 35. In the operation hereunder, the motor 30 is effective for high speed operation of this beater in the range of 500 or 1,200 R. P. M. or even greater. Accordingly, as particles may be impinged on the baffles 29 and not have sufficient buoyancy to discharge by way of the outlet 28 but descend into trough-like bottom portions 36 of this chamber or stage 27, the beaters 34 vigorously act thereon. In this rotation there is a pair of these shaft sections 32 with the sides toward each other, each centrally turning down so the beaters rotate in opposite directions for throwing the material upward against the outer sides of the chamber 27, there for the draft to pick such up or discharge by way of the upper central opening 28 into minor chamber 37. The horizontal parallel shaft sections 32 each have a beater thereon operable in a trough section of the bottom. The beaters are so close to abutting relation that the rib between the trough sections is below the shafts 32, which leaves a major portion of the beaters upwardly therefrom. In effect, this is a classifier permitting the lighter vaporizable portions as acted upon by the hot air to be drawn from about the passages 12, 13, in the suspension and mixed with the products of combustion as from the heat source or furnace. In practice, this may be at a temperature of 800° F. to 1200° F. which, were it maintained, would be close to approaching the combustion for organic matter. However, with the moisture as a steam envelope or jacket atmosphere there is retarded, or in practice actually suppressed, any tendency to combustion in the efficient operation hereunder. This more buoyant steam or moisture laden portion is free to escape from this chamber portion 37 by way of passage 38, while the more heavy particles or body of the material may descend by way of incline or chute 39 for exit by passage 40 into second stage chamber 41. A control for this flow of particles is subject to manual adjustment, for above this incline 39 is damper 42 having protruding arm 43 (Figs. 4, 7). This arm may be adjusted and anchored by set screw 44 at the desired inclination. As swung away from the chamber 41 and toward the chamber 27, there is regulated cut-off or retarding means as to the flow from the chamber 27 by way of the incline 39 toward the chamber 41.

This chamber 41 may have the baffles 29 in more or less relation to the baffles 29 in the chamber 27. The shaft section 32 in this chamber 41 departs from the shaft section in the chamber 27, in that, instead of but one slat 34 in the diametrical arm set-up, there are two of these slats 34 at 180° apart instead of the bar 35. Accordingly, at the same speed of rotation for this shaft 32 in the chamber 41 there is more beating action due to the two bars instead of the single bar in the chamber 27.

In the transit from this chamber 41 to succeeding chamber 45, the shaft section 32 herein carries disks 46 having interconnecting rods 47, on which are freely mounted flatwise arms 48 set in staggered relation so that at each rotation of the shaft 32 at high speed, these arms 48 in their radial swing have their staggering effective in lineal continuity to wipe semi-cylindrical bottom portion 36 with slight clearance of say one-half inch, to beat and elevate any precipitating particles from the draft. Furthermore, the terminal disks 46 have thereon radially extending angle bars 49 as clearance-providing means or fans to clear the terminal portions of this chamber 45 along the concave trough portion 36.

In addition to the chamber 27 and its similar chambers 41, 45, there are succeeding chambers 50 and 51. The chamber 50 has staggered arms 52 in more numerous relation, say twice as many, and accordingly narrower than the arms 48. In the chamber 51, instead of flat arms as spaced in the staggered relation along the shaft, the arms are edgewise plates or fingers 53, likewise in staggered relation but in such continuity that there is effective clearing of the trough portion 36. This increase in the beating or mechanical subdividing action as the material is pneumatically progressed tends to reduce the size of the particles to such extent that inner perforate quadrant portions 54 (Fig. 6) provide discharge way into take-off 55, which has intake connection 56 to blower or rotary fan 57 operated by motor 58, thus drawing off the subdivided dehydrated fines for projection through riser duct 59 and delivery to cyclone dust collector 60 with discharge 61 say for bagging or other collecting operation. Dust or vapor escape may be by way of hood 62 on this cyclone 60.

Heavier particles as thrown by the mechanical beaters in the respective chambers or stages away from the chambers 27, elevate such for falling into troughs 63 (Figs. 4, 6), there to be handled by screw conveyors 64 as extending through connecting passages 65 (Fig. 1) between the respective sections for conveyor discharge 66 (Fig. 4) into the chamber 27. This means that the coarser or heavier products are automatically classified or removed from the pneumatically progressed and agitated material, for the coarser or heavier particles to repeat the travel cycle from the chamber 27 through the stages 41, 45, 50, 51, with the flow therebetween adjusted by the damper 42. As the subdivision is increased, there is more ready release of moisture from the particles. The moisture, as in these respective chamber sections 37 intermediate the stages, may pass by the take-off ducts 38 to trunk duct 67 (Fig. 7) and there by down duct 68 extend to be drawn in by motor driven blower 69 for subatmospheric draft or pull in removing humid air. This withdrawal of the generating vapors tends to increase the capacity of the installation to handle fines. It is desired to take out only humid air, say for discharge 70 into the atmosphere or for dust collection as may be appropriate. Between these passages 12, 13, there is clearance for intake openings 71 (Fig. 8) with draw-off passage 72 (Fig. 1) therefrom to motor operated multi-blade suction fan or blower 73 effective to draw this warm air and deliver such by passage 74 into the combustion chamber 8. This is a factor of heat economy in the operation hereunder for warming the air in supporting the products of combustion in the chamber 8. In the event the furnace 1 operates on induced draft, the motor 73 may be eliminated.

Furthermore, a follower stage or final stage 51 may have temperature device or thermostat 75 (Fig. 1) with connection 76 to motor 77 as a controller for damper 78 at intake 79. This is a control for letting in outside or fresh air to cut down the temperature of the air taken by the duct 17 and accordingly the temperature of the sustaining blowing air at the high speed delivery passage 20. In practice, with the volume of steam or vapor to provide the atmosphere, such is of quenching traits and may permit the non-combustible functioning hereunder with the temperature at this final chamber 51 in the region of 150° to 300° F.

There is range of flexibility under the disclosure herein, not only as to the automatic temperature adjustment, but such may be in the speed of the operation of the beaters; the temperature in the heat source as well as in the blowers or quantity of fresh air taken in; the speed of the take-off blowers, whether for the fines or the humidity; and the control or feed rate from the hopper and inter-chamber damper adjustment. Additionally, the set-up may involve selection or inter-furnace or heat supply along the group. The fact that the flow is a suspension flow pneumatically, with the mechanical boosters serving as classifiers and subdividers, makes possible economic functioning even to insulation or jacketing of the respective chambers, with the re-generated heating in drawing such warm air for the blower sources. The extent of the mechanical beaters or means for the subdividing may be graduated at variance or in different degrees as herein disclosed, preferably in sequence for efficient minimum horse power consumption, with time interval for the transit say one to five minutes. The variance may be also in the character of the stock say from alfalfa to carrots, with range of weather requirements according to the initial subdivision as cut up into ¼ to 2 inch lengths before entering the hopper 22.

The set-up may be even against return of heavier particles but to run such through continuously, say by cutting out the conveyors systems in Fig. 1 or having the solids rejected taken off by conveyor 80 from final chamber or stage 81 (Fig. 8) with discharge 82 of this conveyor for the rejected particles or coarse, while the desired fines may pass to the cyclone in the regular course. In this set-up there is shown in the stage introduction of intermediate furnace 83 in addition to the starting furnace 1. There is cross delivery from the plurality of initial stages effected pneumatically by motor driven blower or fan 84 and duct 85 to cyclone 86, thereby as a feeder source for chamber or stage 87 in its course to chamber 88 and the final chamber 81. In this grouping, the trunk ducts 67 may extend by way of duct 89 to blower 90 with discharge 91 to deliver to dust collector or raw atmosphere. In this set-up there is shown the sequence of the chambers or stages 27, 41, 45, in the series as a plurality of stages with the second series shown as stages 87, 88, 81.

The installation herein disclosed has flexibility range for wide adaptation. While the material handled may be granular or with the body holding consistency, there is special value in the handling of foodstuffs, whether root products such as carrots, potatoes, parsnips, or the like; okra; fruits, such as apples, prunes, or even tomatoes; and leafy products, such as cabbage and celery, and even to stem products. In this field it goes to the chlorophyll portions as well as the stems, as alsike, alfalfa, clovers, grasses, and even in the cereal field. The stem or coarser materials are desirably cut up to ¼ to 2 inch lengths; the shorter cut, the more effective hereunder. In event of a great quantity juice carrying products, such as tomatoes, it may be desirable to commingle therewith other substances such as for soups for contributing to the body holding material against deposit accumulation on the interior of the chambers or for the stages. However, for sanitary attention, closures 92 for the respective chambers or stages permit access thereto for cleaning.

The speed control 15 is such that in the feed from the hopper 22 there may be a range say from around 1 or 2 R. P. M. for the finger-carrying members up to say ten times such speed. At the determined rate of feed in passing this material from the hopper 22 into the path of the thin blast from the opening 20, such hot blast is effective to carry this moisture laden material directly into the chamber 27. In this carrying forward there is a hot atmosphere delivered from the ducts 13, 14, also to this chamber 27. This enveloping and drying atmosphere from the heat source may be induced from the take-off fan 57, or promoted by blast from the fan 73. In the carrying out of the invention for pneumatically progressing the substances, efficiency in response is availed of by taking off by way of the ducts 38 moisture laden fumes, desirably not of a volume to carry fines therewith. This may be induced say by the fan 69 adjusted to promote the lineal travel of the pneumatic material carrying draft. The ranges of adjustment for these fans 57, 69, 73, as well as the adjustment 15 for the feed, readily adapt the installation for the wide departure in the character of materials handled, to the end that the substance, as fines, may pass to the collector cyclone 60 with the major portion of the moisture or humidity taken off through the duct 38 or the residue thereof by way of the escape portion 62 at the cyclone 60.

What is claimed and it is desired to secure by Letters Patent is:

1. Material subdividing drying apparatus comprising a housing section, material subdividing beater means adapted to act upon supplied material to effect comminution thereof during drying, supply means to the section for material-to-be-dried-and-subdivided, supply means to the section for drying air, a screen wall portion for the housing at the beater providing a discharge therethru for fines passing thru the screen, and an additional discharge into which the beater is effective to deliver material not passing thru the screen.

2. Material subdividing drying apparatus comprising a housing section, material subdividing rotary beater means adapted to act upon supplied material to effect comminution thereof during drying, supply means to the section for material-to-be-dried-and-subdivided, supply means to the section for drying air, a wall portion having a discharge opening therefrom for fines of the subdivided material, an additional discharge above the beater means into which the beater means is effective to deliver more coarse material as thrown by the beater means, and a conveyor from the additional discharge adapted to transfer said more coarse material toward the supply means for said housing section for further subdividing action thereon by the beater means in recycling the material toward said discharges, said supply means having entrance connection to the apparatus axially from and beyond the beater means.

3. Material subdividing drying apparatus comprising a housing structure with a chamber, there being means providing a draft course lengthwise of the chamber, a pair of material subdividing rotary beater means extending axially in the direction of said draft course and adapted to act upon supplied material to effect comminution thereof during drying, supply means to the chamber for material-to-be-dried-and-subdivided, supply means to the chamber for drying air, said chamber having a bottom rib at which merge a pair of laterally abutting troughs forming seats in which the respective beater means may operate in major extent upwardly from said rib, said chamber having major volume extent upward from the beater means into which said supply means deliver, and a discharge for partially dried material from said major volume extent portion of the chamber remote from the supply means.

OLIVER W. RANDOLPH.

REFERENCES CITED

The following references are of record in the file of this patent:

UNITED STATES PATENTS

| Number | Name | Date |
|---|---|---|
| 426,361 | Buttner et al. | Apr. 22, 1890 |
| 571,588 | Albrecht | Nov. 17, 1896 |
| 589,236 | Williams | Aug. 31, 1897 |
| 664,903 | Seldner | Jan. 1, 1901 |
| 708,604 | Welch | Sept. 9, 1902 |
| 851,607 | Du Pont | Apr. 23, 1907 |
| 1,019,958 | Hannam et al. | Mar. 12, 1912 |
| 1,353,591 | Hope et al. | Sept. 21, 1920 |
| 1,433,042 | Sedberry | Oct. 24, 1922 |
| 1,443,367 | Kennedy | Jan. 30, 1923 |
| 1,449,510 | Holcomb | Mar. 27, 1923 |
| 1,554,780 | Berrigan et al. | Sept. 22, 1925 |
| 1,982,595 | Park | Nov. 27, 1934 |
| 1,988,687 | Arnold | Jan. 22, 1935 |
| 2,017,586 | Cottee | Oct. 15, 1935 |
| 2,035,716 | Peek | Mar. 31, 1936 |
| 2,066,615 | Everett | Jan. 5, 1937 |
| 2,068,599 | Ehrsam | Jan. 19, 1937 |
| 2,202,151 | Hinckley, Jr. | May 28, 1940 |
| 2,231,342 | Loyless | Feb. 11, 1941 |
| 2,289,727 | Randolph | July 14, 1942 |